Aug. 6, 1957     R. SCHÖTTLE     2,801,545
UNIVERSAL KITCHEN MACHINE
Filed July 8, 1953
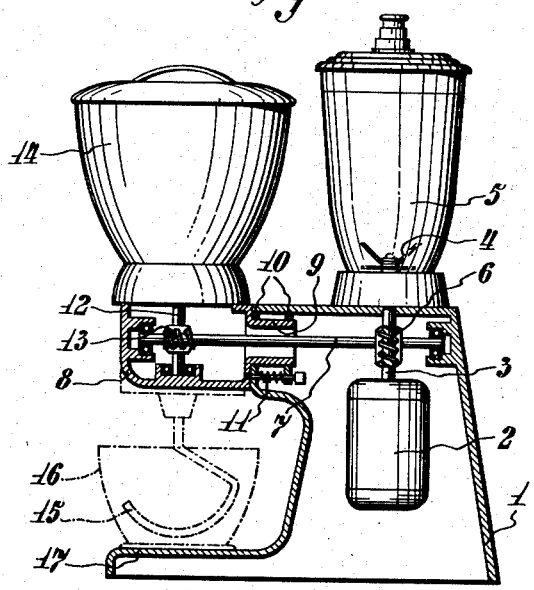
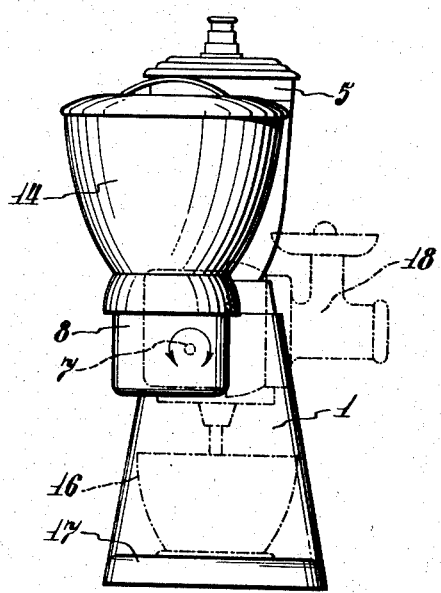
Inventor:
Robert SCHÖTTLE
By Richards & Geier
Attorneys

United States Patent Office 2,801,545
Patented Aug. 6, 1957

2,801,545

UNIVERSAL KITCHEN MACHINE

Robert Schöttle, Reichenbach (Fils), Germany

Application July 8, 1953, Serial No. 366,845

2 Claims. (Cl. 74—16)

This invention relates to a universal kitchen machine.

An object of the invention is the provision of a universal kitchen machine which is comparatively inexpensive to manufacture and which can be used most effectively for a variety of purposes.

Another object is the provision of a universal kitchen machine which does not require two sockets, as necessary in prior art constructions.

Yet another object is the provision of a universal kitchen machine wherein the need for the use of one or more driving shafts and the intermediate gears is effectively eliminated.

Other objects of the present invention will become apparent in the course of the following specification.

In accomplishing the objects of the present invention it was found desirable to provide a universal kitchen machine having a drive-containing base or casing which is always used in the same position. This effectively differentiates the machine in accordance with the present invention from prior art machines wherein the drive-containing casing had to be shifted to a plurality of different positions in order to attach different utensils to the machine.

In accordance with the present invention the casing contains a rotatably mounted driving head which is in engagement with a horizontal driving shaft. The driving head requires only one socket since due to its rotary motion the place of connection of the utensils to the machine can have different locations in space according to the number of utensils, or tools, to be connected to the driving head. Such connection will always be carried out in a most simple and effective manner. The rotary driving head can be set and adjusted in various required locations.

The invention will appear more clearly from the following detailed description when taken in connection with the accompanying drawing showing, by way of example, a preferred embodiment of the inventive idea.

In the drawing:

Figure 1 is a section through the base and a driving head of the machine, the other portions of the machine being shown in side elevation.

Figure 2 is a side view of the machine shown in Figure 1.

The machine shown in the drawing includes a casing, or base, 1 which contains an electrical motor 2 provide with a vertical motor shaft 3. The motor shaft 3 extends through the top cover of the casing and is used for operating suitable, quickly rotating mixers or tools therefor, located on the bottom of a mixing container 5 which is placed on the top of the casing 1. The coupling of the tools 4 with the motor shaft 3 is effected as soon as the container 5 is placed in the proper position upon the casing 1 by any suitable coupling means not shown in the drawing.

The motor shaft 3 is provided with a worm 6 which obviously may be replaced by a gear. The worm 6 meshes with a gear carried by a horizontal shaft 7. One end of shaft 7 is carried by a bearing mounted in an inner wall of the casing 1. The opposite end of the shaft 7 is located within a drive head 8.

The drive head 8 extends horizontally and has the form of a casing which is rotatably mounted in the casing or base 1. In the example illustrated the drive head 8 is provided with a sleeve 9 which extends concentrically around the shaft 7 and fits into a bearing 10 provided in the casing 1. Thus the driving head 8 can be conveniently rotated around the casing 1 and may be supported in a number of different positions relatively to the casing 1. In the example illustrated the means holding the head 8 relatively to the casing 1 consists of a bolt 11 engaged by a spring and carried by the bearing 10. The bolt 11 fits into one of several openings provided in the head 8. It is apparent that in actual practice the device 11 for holding the head 8 will be so constructed that it will be conveniently accessible to and usable by the operator.

The driving head 8 supports a vertical driving shaft 12 provided with gears which mesh with a worm 13 carried by the horizontal shaft 7. Obviously, the worm 13 may also be replaced by a gear.

It is sufficient when the driving shaft 12 extends only with one end from the head 8, to provide a connecting location for additional tools or utensils.

By way of example, a stirring part 14 is mounted upon the head 8 in such manner that the rotary elements located in that part are coupled with a shaft 12.

A mixing or stirring container 16 provided with a mixer 15 is shown by broken lines in Figure 1. It is apparent that the stirring element 15 may be effectively coupled with the shaft 12 when the head 8 is turned to the extent of 180° from the position shown in full lines in Figure 1 to the position shown in broken lines in Figures 1 and 2. The container 16 carrying the tool 15 may be placed upon a table-like extension 17 constituting a part of the casing 1. Obviously, the container 16 can be placed directly upon the table carrying the support 1.

Figure 2 also shows by broken lines an intermediate position of the head 8 which has been rotated to the extent of 90° from the position shown in full lines in Figures 1 and 2. In this intermediate position the head 8 can be conveniently connected to a grinder 18 for meat or vegetables which is shown by broken lines in Figure 2.

The head 8 may also be held in other intermediate positions since at times it may be advantageous to maintain the stirring element 14 in a somewhat inclined position so as to facilitate stirring of the contents in the pot, particularly as such contents are becoming rather low.

A further advantage of providing a rotary head 8 is that the user need not raise the container 14 from the head for the purpose of emptying the container. The user can keep the container in its coupled position upon the head and then turn the head until emptying of the contents of the container 14 takes place. It should be noted that at that time the operator has both hands free for use to do this work.

It is apparent that the example shown above has been given solely by way of exemplification and not by way of limitation. For example, the shaft 12 in the driving head 8 may extend with both ends through the head 8 so as to provide two opposite connecting locations should this be required for any specific purpose. All such and similar variations and modifications are to be included within the scope of the present invention.

What is claimed is:

1. A universal kitchen machine, comprising a casing, an electrical motor within said casing, a vertical motor shaft driven by said motor, another tool-engaging shaft extending horizontally and transversely to said motor shaft, means operatively interconnecting the two shafts, a drive head supporting said other shaft and mounted in said casing for rotation about said other shaft, and a plurality of tool actuators connected with the two shafts.

2. A universal kitchen machine, comprising a casing, an electrical motor within said casing, a vertical motor shaft driven by said motor, another tool-engaging shaft extending horizontally and transversely to said motor shaft, means operatively interconnecting the two shafts, a drive head supporting said other shaft and mounted in said casing for rotation about said other shaft, means locking said drive head in any one of a plurality of positions relatively to said casing, and a plurality of tool actuators connected with the two shafts.

References Cited in the file of this patent
UNITED STATES PATENTS

| | | |
|---|---|---|
| 2,483,905 | Hubman | Oct. 4, 1949 |